(12) United States Patent
Xue et al.

(10) Patent No.: US 11,239,558 B2
(45) Date of Patent: Feb. 1, 2022

(54) TERMINAL DEVICE

(71) Applicant: BEIJING XIAOMI MOBILE SOFTWARE CO., LTD., Beijing (CN)

(72) Inventors: Zonglin Xue, Beijing (CN); Ching-sung Wang, Beijing (CN); Yongbo Yue, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 200 days.

(21) Appl. No.: 16/742,986

(22) Filed: Jan. 15, 2020

(65) Prior Publication Data

US 2021/0091469 A1  Mar. 25, 2021

(30) Foreign Application Priority Data

Sep. 24, 2019 (CN) .......................... 201910907106.2

(51) Int. Cl.
*H01Q 1/24* (2006.01)
*H01Q 5/357* (2015.01)

(52) U.S. Cl.
CPC .............. *H01Q 5/357* (2015.01); *H01Q 1/243* (2013.01)

(58) Field of Classification Search
CPC ................................ H01G 1/243; H01G 5/357
See application file for complete search history.

(56) References Cited

U.S. PATENT DOCUMENTS 10,476,137 B1  11/2019  Su

FOREIGN PATENT DOCUMENTS

| CN | 105655686 A | 6/2016 |
|---|---|---|
| CN | 106992359 A | 7/2017 |
| CN | 107331964 A | 11/2017 |
| CN | 108598666 A | 9/2018 |
| WO | 2017185865 A1 | 11/2017 |

OTHER PUBLICATIONS

Extended European Search Report in the European Application No. 20152523.5, dated Aug. 6, 2020, (7p).

*Primary Examiner* — Graham P Smith
(74) *Attorney, Agent, or Firm* — Arch & Lake LLP

(57) ABSTRACT

A terminal device is provided, which includes: a housing including a conductive frame provided with a first frame connecting point, a second frame connecting point and a grounding point; and a feeding point disposed on a circuit board. A first antenna is formed by the feeding point, the first signal wire, the first frame connecting point, the third signal wire and the conductive frame when the first frame connecting point is connected with the feeding point through a first signal wire and the second frame connecting point is disconnected from the feeding point. A second antenna is formed by the feeding point, the second signal wire, the third signal wire, the second frame connecting point and the conductive frame when the first frame connecting point is disconnected from the feeding point and the second frame connecting point is connected with the feeding point through a second signal wire.

20 Claims, 5 Drawing Sheets

TERMINAL DEVICE

CROSS-REFERENCE TO RELATED APPLICATIONS

This application claims priority to Chinese Patent Application 201910907106.2, filed on Sep. 24, 2019, the disclosure of which is hereby incorporated by reference in its entirety.

TECHNICAL FIELD

The present disclosure relates to the technical field of communication, and particularly relates to a terminal device.

BACKGROUND

With the rapid development of the communication technology and demand for science and technology, terminal devices have been gradually developed towards the objectives of small headroom, a high screen-to-body ratio and convergence of the 4th Generation mobile communication technology (4G) and the 5th Generation mobile communication technology (5G). The traditional antenna technology is increasingly conflicting with the demands for small headroom and high screen-to-body ratio, which may result in a problem of large space occupation in a terminal device.

SUMMARY

A terminal device is provided in the present disclosure.

In a first aspect according to the present disclosure, a terminal device is provided, which at least includes a housing and a feeding point.

The housing includes a conductive frame. A first frame connecting point, a second frame connecting point and a grounding point are disposed on the conductive frame, and the second frame connecting point is disposed between the first frame connecting point and the grounding point.

The feeding point is disposed on a circuit board and configured to input or output an electric signal. The grounding point is connected with a first grounding end through a third signal wire, and the first grounding end is disposed on the circuit board.

A first antenna is formed by the feeding point, a first signal wire, the first frame connecting point, the third signal wire and the conductive frame when the first frame connecting point is connected with the feeding point through the first signal wire and the second frame connecting point is disconnected from the feeding point, and the first antenna is configured to receive and transmit a first wireless signal in a first frequency band;

A second antenna is formed by the feeding point, a second signal wire, the third signal wire, the second frame connecting point and the conductive frame when the first frame connecting point is disconnected from the feeding point and the second frame connecting point is connected with the feeding point through the second signal wire, and the second antenna is configured to receive and transmit a second wireless signal in a second frequency band.

A center frequency of the first frequency band is higher than a center frequency of the second frequency band.

It should be understood that the above general description and the following detailed description are merely exemplary and explanatory, rather than limiting the present disclosure.

BRIEF DESCRIPTION OF THE DRAWINGS

The accompanying drawings, which are incorporated into the specification and constitute a part of the specification, illustrate embodiments consistent with the disclosure and, along with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
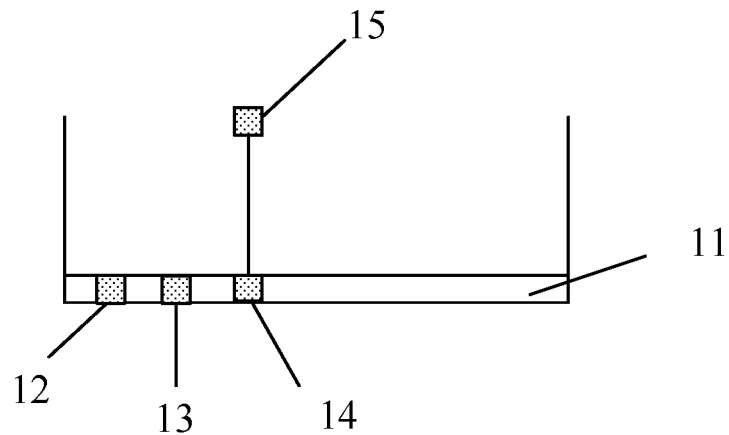
FIG. 1 is a first schematic diagram of a terminal device according to an example.

FIG. 1 is a first schematic diagram of a terminal device according to an example. As shown in FIG. 1, the terminal device at least includes a housing 11, and a feeding point.

The housing 11 includes a conductive frame. A first frame connecting point 12, a second frame connecting point 13 and a grounding point 14 are disposed on the conductive frame, and the second frame connecting point 13 is disposed between the first frame connecting point 12 and the grounding point 14.

The feeding point is disposed on a circuit board, and configured to input or output an electric signal. The grounding point 14 is connected with a first grounding end 15 through a third signal wire, and the first grounding end 15 is disposed on the circuit board.

When the first frame connecting point 12 is connected with the feeding point through a first signal wire and the second frame connecting point 13 is disconnected from the feeding point, a first antenna is formed and/or activated. The first antenna includes the feeding point, the first signal wire, the first frame connecting point 12, the third signal wire and the conductive frame, and the first antenna is configured to receive and transmit a first wireless signal in a first frequency band.

When the first frame connecting point 12 is disconnected from the feeding point, and the second frame connecting point 13 is connected with the feeding point through a second signal wire, a second antenna is formed and/or activated. The second antenna includes the feeding point, the second signal wire, the third signal wire, the second frame connecting point 13, and the conductive frame, and the second antenna is configured to receive and transmit a second wireless signal in a second frequency band.

A center frequency of the first frequency band is higher than a center frequency of the second frequency band.

In the embodiments of the present disclosure, the terminal device may be a wearable electronic device and a mobile terminal, the mobile terminal includes a mobile phone, a notebook computer and a tablet computer, and the wearable electronic device includes a smart watch, which are not limited in the embodiments of the present disclosure.

The shape of the housing may be set according to the needs of users. For example, the housing of the terminal device may be set to be a rectangular housing, which is not limited in the embodiments of the present disclosure.

The housing includes the conductive frame which may be made of a metal, an alloy material or a conductive plastic and has a conductive function.

The feeding point is disposed on the circuit board, and the circuit board includes, but is not limited to, a Printed Circuit Board (PCB) of the terminal device.

It should be noted that the feeding point transmits the electric signal to the conductive frame through the first signal wire or the second signal wire, the conductive frame radiates a wireless signal under the excitation of the electric signal. Alternatively, the conductive frame converts a received wireless signal into an electric signal and transmits the electric signal to the feeding point through the first signal wire or the second signal wire, and the feeding point transmits the electric signal to a radio frequency processing module of a mobile terminal, thereby realizing subsequent processing, such as receiving of the wireless signals and decoding of the signals.

The first grounding end is disposed on the circuit board and may be connected with the grounding point on the circuit board. A mode of connecting the first grounding end to the grounding point on the circuit board includes, but is not limited to, an antenna spring, an antenna thimble or welding, which is not limited in the embodiments of the present disclosure.

In the embodiments of the present disclosure, since the first frame connecting point and the second frame connecting point are disposed at different positions, the conductive frames for forming antennas have different length. The length of the conductive frame in formation of the antenna is used as a radiator of the antenna, and the radiator of the antenna is relevant to the wavelength of a wireless signal radiated by the antenna. Therefore, the switching between a first antenna and a second antenna may be realized by switching a connection relationship between the feeding point and the first frame connecting point and between the feeding point and the second frame connecting point, so that the mobile terminal can receive or transmit a wireless signal in different frequency bands.

It should be noted that the feeding point may be connected with the first frame connecting point through the first signal wire to transmit the electric signal to the first frame connecting point. The feeding point may be connected with the second frame connecting point through the second signal wire to transmit the electric signal to the second frame connecting point. When the first frame connecting point is connected with the feeding point and the second frame connecting point is not connected with the feeding point, the first antenna is formed. When the first frame connecting point is not connected with the feeding point and the second frame connecting point is connected with the feeding point, the second antenna is formed.

In the embodiments of the present disclosure, the first antenna receives and transmits a wireless signal in the first frequency band.

For example, the wireless signal in the first frequency band may include a wireless signal in a frequency band from 2300 MHz to 2690 MHz, and may also include a wireless signal in a frequency band from 4400 MHz to 5000 MHz.

In the embodiments of the present disclosure, the second antenna receives and transmits a wireless signal in the second frequency band.

For example, the wireless signal in the second frequency band may include a wireless signal in a frequency band from 1710 MHz to 2170 MHz, and may also include wireless signal in a frequency band from 3300 MHz to 3800 MHz.

Therefore, when the first frequency band ranges from 2300 MHz to 2690 MHz and the second frequency band ranges from 1710 MHz to 2170 MHz, a center frequency of the first frequency band is 2495 MHz, and a center frequency of the second frequency band is 1940 MHz. Obviously, the center frequency of the first frequency band is higher than the center frequency of the second frequency band.

When the first frequency band ranges from 4400 MHz to 5000 MHz and the second frequency band ranges from 3300 MHz to 3800 MHz, a center frequency of the first frequency band is 4700 MHz, and a center frequency of the second frequency band is 3550 MHz. Obviously, the center frequency of the first frequency band is higher than the center frequency of the second frequency band.

It can be understood that in the embodiments of the present disclosure, an antenna for receiving and transmitting a wireless signal in an intermediate frequency or a high frequency may be formed according to the connection between the first frame connecting point as well as the second frame connecting point and the feeding point. On the one hand, the demands for antennas in different scenes may be met. On the other hand, it is not necessary to separately dispose an antenna for receiving and transmitting the wireless signal in the intermediate frequency and an antenna for receiving and transmitting the wireless signal in the high frequency, thereby solving the problem that a large space of the terminal device is occupied by separately disposed two antennas, and improving a space utilization ratio of the terminal device.

In one or more embodiments, when the first frame connecting point is connected with the feeding point through the first signal wire and the second frame connecting point is connected with the feeding point through the second signal wire, a third antenna is formed by the feeding point, the first signal wire, the second signal wire, the third signal wire, the first frame connecting point, the second frame connecting point and the conductive frame, and the third antenna is configured to enhance the intensity of a signal in a boundary frequency of the first frequency band.

In the embodiments of the present disclosure, the third antenna is formed when the first frame connecting point is connected with the feeding point and the second frame connecting point is connected with the feeding point, according to the connection between the first frame connecting point as well as the second frame connecting point and the feeding point. The third antenna may finely regulate the boundary frequency of the first frequency band or the second frequency band to enhance the intensity of the signal in the boundary frequency, and further improve the sideband performance of the antenna.

It can be understood that in the embodiments of the present disclosure, the first antenna and the second antenna may be formed to receive and transmit the wireless signal in the intermediate frequency or the high frequency, and the third antenna may also be formed to enhance the intensity of the signal in the boundary frequency of the first frequency band or the second frequency band.

In one or more embodiments, the terminal device also includes a fourth antenna.

The fourth antenna configured to receive and transmit a wireless signal, a center frequency of which is lower than the center frequency of the second frequency band. When the fourth antenna receives and transmits the wireless signal, the first frame connecting point is disconnected from the feeding point, and the second frame connecting point is disconnected from the feeding point.

In the embodiments of the present disclosure, when the fourth antenna on the terminal device receives and transmits the wireless signal, the fourth antenna may not need to receive and transmit the wireless signal in the first frequency band and/or the second frequency band, and the fourth antenna may be interfered with in receiving and transmitting the wireless signals in the first frequency band and/or the second frequency band. Therefore, in the embodiments of the present disclosure, when the fourth antenna receives and transmits the wireless signal, the first frame connecting point is disconnected from the feeding point, and the second frame connecting point is disconnected from the feeding point, thereby reducing the interference to the fourth antenna, and improving the isolation with the fourth antenna.

It should be noted that the fourth antenna may be disposed on the circuit board in the terminal device, disposed on a back shell of the housing or disposed between two functional modules on the terminal device, which is not limited in the embodiments of the present disclosure.

It can be understood that in the embodiments of the present disclosure, when other antennas on the terminal device are in operation, the first frame connecting point is disconnected from the feeding point, and the second frame connecting point is disconnected from the feeding point, thereby reducing interference to other antennas.

In one or more embodiments, the terminal device also includes a first switch circuitry and/or a second switch circuitry.

The first switch circuitry is disposed on the first signal wire. When the first switch circuitry is in a switched-off state, the first frame connecting point is disconnected from the feeding point, and when the first switch circuitry is in a switched-on state, the first frame connecting point is connected with the feeding point through the first signal wire.

The second switch circuitry is disposed on the second signal wire. When the second switch circuitry is in a switched-off state, the second frame connecting point is disconnected from the feeding point, and when the second switch circuitry is in a switched-on state, the second frame connecting point is connected with the feeding point through the second signal wire.

In the embodiments of the present disclosure, different antennas may be formed in the terminal device by regulating the connection relationship between the first frame connecting point and the feeding point and the connection relationship between the second frame connecting point and the feeding point. In the process of regulating the above connection relationships, the connection relationship may be regulated by disposing switch circuitries. Specifically, a first switch circuitry is disposed on the first signal wire, and the switched-on state and switched-off state of the first switch circuitry may be switched to connect the first frame connecting point with the feeding point or disconnect the first frame connecting point from the feeding point. A second switch circuitry is disposed on the second signal wire, and the switched-on state and switched-off state of the second switch circuitry may be switched to connect the second frame connecting point with the feeding point or disconnect the second frame connecting point from the feeding point.

For example, the first switch circuitry and the second switch circuitry may be a 8-pin common antenna switch, a 9-pin common antenna switch or a 13-pin common antenna switch, which is not limited in the embodiments of the present disclosure.

Figure 2:
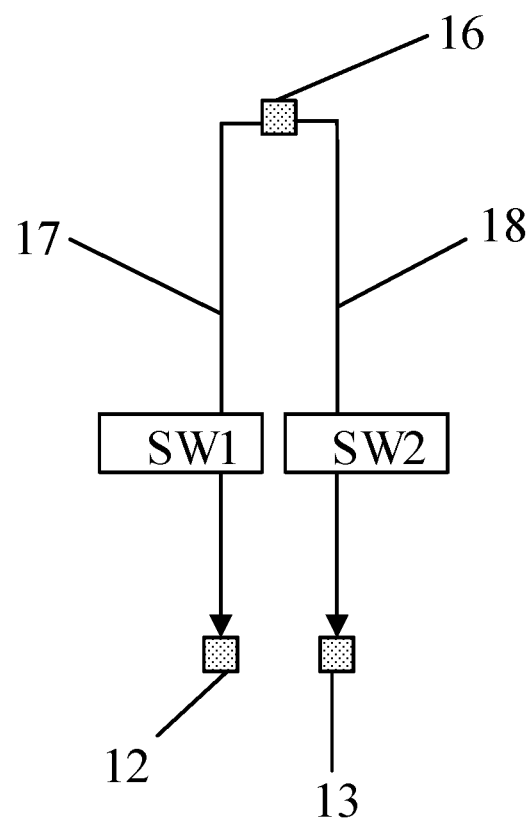
FIG. 2 is a second schematic diagram of a terminal device according to an example.

As shown in FIG. 2, a feeding point 16 is connected with a first frame connecting point 12 through a first signal wire 17, the feeding point 16 is connected with a second frame connecting point 13 through a second signal wire 18, a first switch circuitry SW1 is disposed on the first signal wire 17, and a second switch circuitry SW2 is disposed on the second signal wire. The switched-on state and switched-off state of the first switch circuitry may be switched to connect the first frame connecting point with the feeding point or disconnect the first frame connecting point from the feeding point. The switched-on state and switched-off state of the second switch circuitry may be switched to connect the second frame connecting point with the feeding point or disconnect the second frame connecting point from the feeding point.

It can be understood that the connection state between the first frame connecting point and the feeding point may be regulated by controlling the switched-on state and switched-off state of the first switch circuitry, and the connection state between the second frame connecting point and the feeding point may be regulated by controlling the switched-on state and switched-off state of the second switch circuitry, thereby facilitating subsequent formation of different antennas based on different connection states.

In one or more embodiments, the terminal device also includes a third switch circuitry.

The third switch circuitry is connected with the second grounding end and the first signal wire, and is configured to disconnect the first signal wire from the second grounding end when a first antenna is formed, and connect the first signal wire with the second grounding end when a second antenna is formed.

It should be noted that when the third switch circuitry is in a switched-on state, the first signal wire is connected with the second grounding end. When the third switch circuitry is in a switched-off state, the first signal wire is disconnected from the second grounding end.

Figure 3:
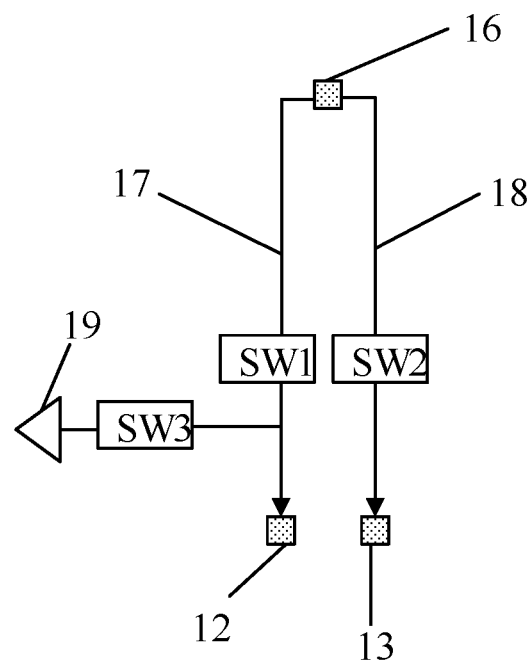
FIG. 3 is a third schematic diagram of a terminal device according to an example.

As shown in FIG. 3, a feeding point 16 is connected with a first frame connecting point 12 through a first signal wire 17, the feeding point 16 is connected with a second frame connecting point 13 through a second signal wire 18, a first switch circuitry SW1 is disposed on the first signal wire 17, a second switch circuitry SW2 is disposed on the second signal wire 18, and connecting points at two sides of a third switch circuitry SW3 are connected with the first signal wire 17 and a second grounding end 19 respectively.

When a first antenna is formed and/or activated, the first switch circuitry SW1 is in a switched-on state, and the second switch circuitry SW2 and the third switch circuitry SW3 are in a switched-off state. When a second antenna is formed, the first switch circuitry SW1, the second switch circuitry SW2 and the third switch circuitry SW3 are in a switched-on state.

When a third antenna is formed and/or activated, the first switch circuitry SW1 and the second switch circuitry SW2 are in a switched-on state, and the third switch circuitry SW3 is in a switched-off state.

In one or more embodiments, the terminal device also includes a fourth switch circuitry.

The fourth switch circuitry is connected with the third grounding end and the second signal wire, and is configured to connect the second signal wire with the third grounding end when the first antenna is formed and disconnect the second signal wire from the third grounding end when the second antenna is formed.

It should be noted that when the fourth switch circuitry is in a switched-on state, the second signal wire is connected with the third grounding end. When the fourth switch circuitry is in a switched-off state, the second signal wire is disconnected from the third grounding end.

Figure 4:
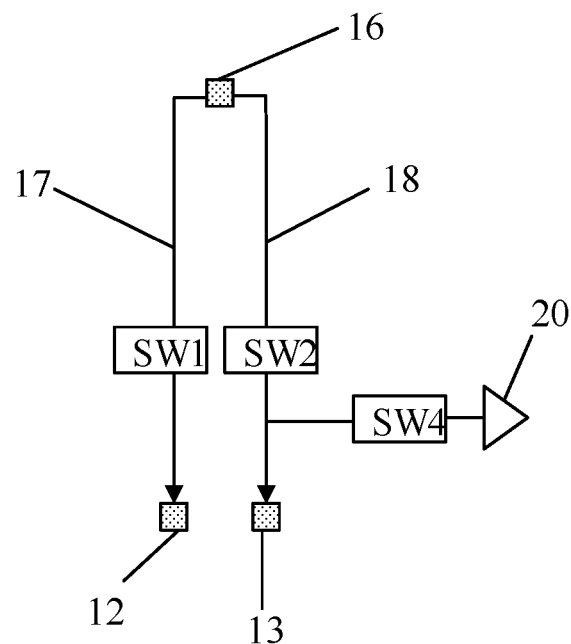
FIG. 4 is a fourth schematic diagram of a terminal device according to an example.

As shown in FIG. 4, a feeding point 16 is connected with a first frame connecting point 12 through a first signal wire 17, the feeding point 16 is connected with a second frame connecting point 13 through a second signal wire 18, a first switch circuitry SW1 is disposed on the first signal wire 17, a second switch circuitry SW2 is disposed on the second signal wire 18, and connecting points at two sides of a fourth switch circuitry SW4 are connected with the second signal wire 18 and a third grounding end 20 respectively.

As can be seen from FIG. 4, when a first antenna is formed, the first switch circuitry SW1, the second switch circuitry SW2 and the fourth switch circuitry SW4 are in a switched-on state.

When a second antenna is formed and/or activated, the first switch circuitry SW1 and the fourth switch circuitry SW4 are in a switched-off state, and the second switch circuitry SW2 is in a switched-on state.

When a third antenna is formed and/or activated, the first switch circuitry SW1 and the second switch circuitry SW2 are in a switched-on state, and the fourth switch circuitry SW4 is in a switched-off state.

In one or more embodiments, the first signal wire and the second signal wire include: a fourth signal wire, a first sub signal wire, and a second sub signal wire.

The fourth signal wire has a first connecting end and a second connecting end, and the first connecting end is connected with the feeding point.

The first sub-signal wire is connected between the first frame connecting point and the second connecting end.

The second sub-signal wire is connected between the second frame connecting point and the second connecting end.

The terminal device includes a fifth switch circuitry.

The fifth switch circuitry is disposed on the fourth signal wire and configured to disconnect the second frame connecting point from the feeding point and disconnect the first frame connecting point from the feeding point when the fourth antenna receives and transmits a wireless signal.

At this time, a path composed of the first sub-signal wire and the fourth signal wire is the first signal wire for connecting the first frame connecting point with the feeding point, and a path composed of the second sub-signal wire and the fourth signal wire is the second signal wire for connecting the second frame connecting point with the feeding point.

Figure 5:
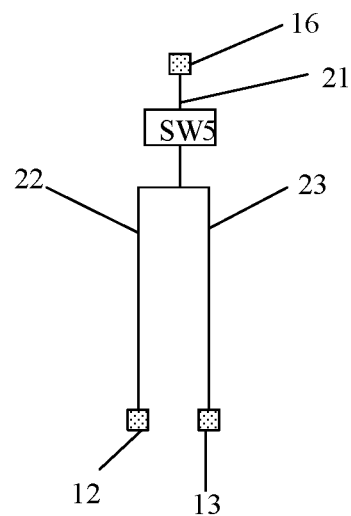
FIG. 5 is a fifth schematic diagram of a terminal device according to an example.

As shown in FIG. 5, a fifth switch circuitry SW5 is disposed on a fourth signal wire 21, the first connecting end of the fourth signal wire 21 is connected with a feeding point 16, the second connecting end of the fourth signal wire 21 is connected with a first sub-signal wire 22 and a second sub-signal wire 23. The first sub-signal wire 22 is connected with a first frame connecting point 12, and the second sub-signal wire 23 is connected with a second frame connecting point 13.

As can be seen from FIG. 5, when the fourth antenna receives and transmits a wireless signal, the fifth switch circuitry SW5 may be controlled to be in a switched-off state to disconnect the second frame connecting point 13 from the feeding point 16 and disconnect the first frame connecting point 12 from the feeding point 16.

Figure 6:
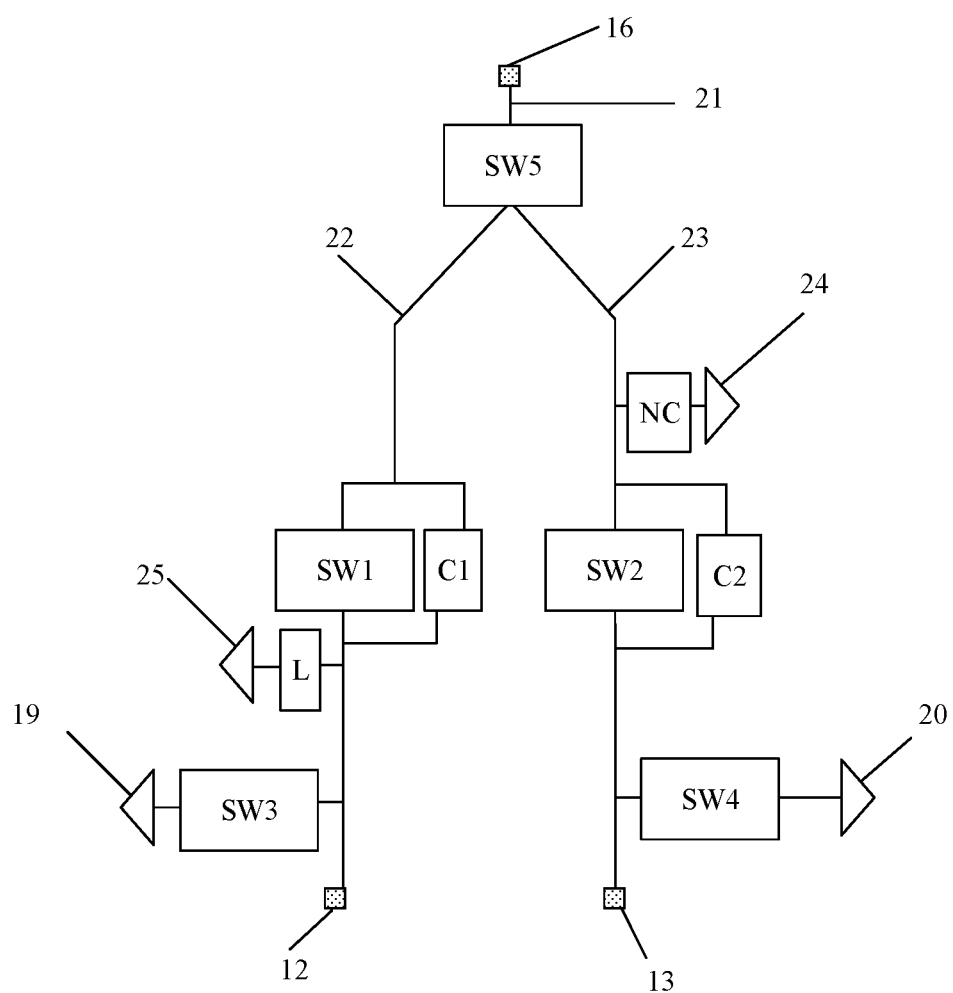
FIG. 6 is a sixth schematic diagram of a terminal device according to an example.

In order to better understand the above embodiments, the following examples are provided. As shown in FIG. 6, on the basis of FIG. 5, a first capacitor C1 and a first switch circuitry SW1 may be disposed on a first sub-signal wire 22, and the first capacitor C1 and the first switch circuitry SW1 are disposed in parallel. A second capacitor C2 and a second switch circuitry SW2 may also be disposed on a second sub-signal wire 23, and the second capacitor C2 and the second switch circuitry SW2 are disposed in parallel. Furthermore, an inductor L and a fourth grounding end 25 may also be disposed on a terminal device, and two connecting points of the inductor L are connected with the first sub-signal wire 22 and the fourth grounding end 25 respectively. A third switch circuitry SW3 may also be disposed on the terminal device, and connecting points at two sides of the third switch circuitry SW3 are connected with the first sub-signal wire 22 and a second grounding end 19 respectively. A fourth switch circuitry SW4 may also be disposed on the terminal device, and connecting points at two sides of the fourth switch circuitry SW4 are connected with the second sub-signal wire 23 and a second grounding end 20 respectively. Furthermore, a fifth grounding end 24 may also be disposed on the terminal device, and the fifth grounding end 24 is connected to the second sub-signal wire 23 through a NC vacant position. In subsequent design processes, components may be disposed in the NC vacant position according to needs. For example, an inductor or a capacitor may be disposed.

Figure 7:
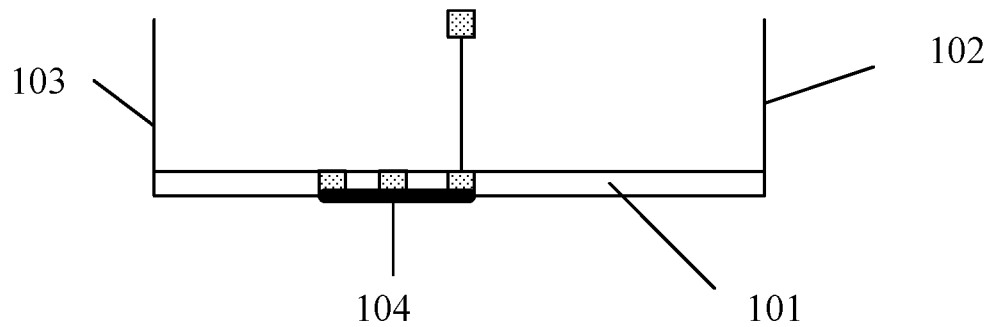
FIG. 7 is a seventh schematic diagram of a terminal device according to an example.

In one or more embodiments, as shown in FIG. 7, the housing is a rectangular housing and includes a first short frame 101, a second long frame 102 and a third long frame 103. The first short frame 101 is connected with the second long frame 102 and the third long frame 103, and the second long frame 102 and the third long frame 103 are oppositely disposed.

At least a portion of the first short frame 101 is a conductive frame 104.

It can be understood that the frame of the housing is used as a conductive frame to receive and transmit a wireless signal, thereby saving the space occupied by the antenna in the terminal device, and improving the space utilization ratio.

In one or more embodiments, a slit is disposed on the first short frame.

The conductive frame is disposed between the slit and the second long frame, or the conductive frame is disposed between the slit and the third long frame.

Figure 8:
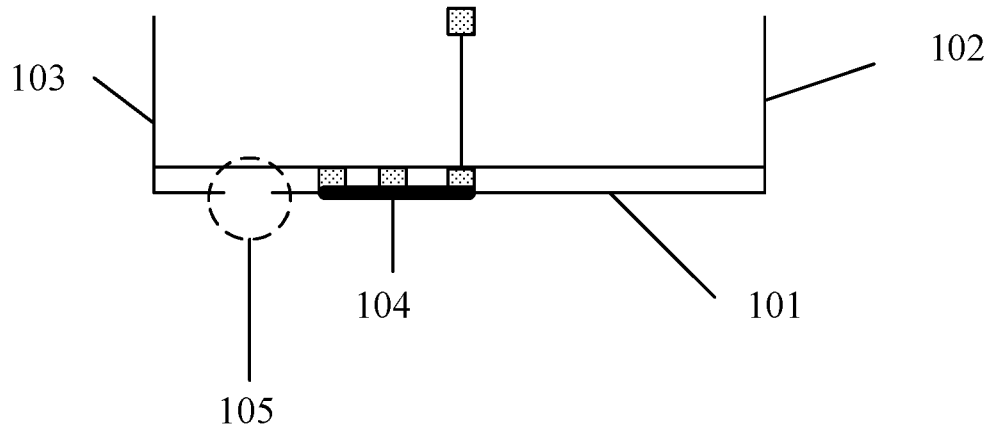
FIG. 8 is an eighth schematic diagram of a terminal device according to an example.
Figure 9:
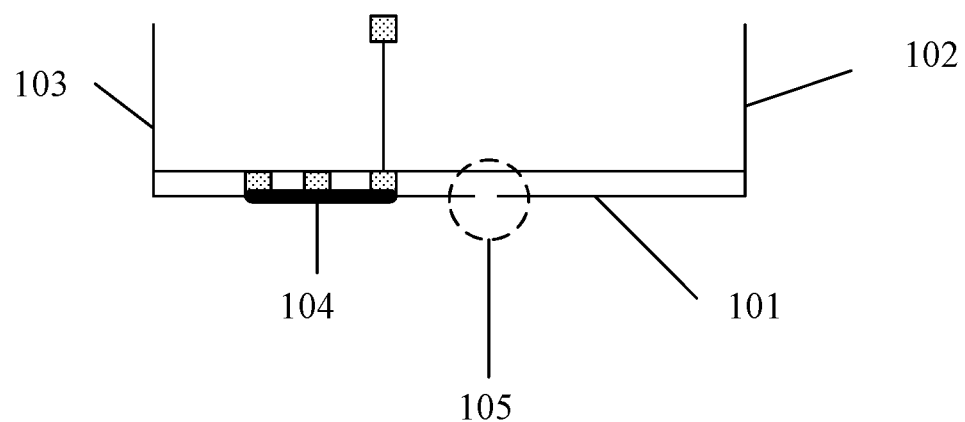
FIG. 9 is a ninth schematic diagram of a terminal device according to an example.

As shown in FIG. 8, a conductive frame 104 is disposed between a slit 105 and a second long frame 102. As shown in FIG. 9, a conductive frame 104 is disposed between a slit 105 and a third long frame 103.

It should be noted that the slit provides a receiving and transmitting inlet and/or a receiving and transmitting outlet with an appropriate width for the wireless signal, thereby further improving the receiving and transmitting efficiency of the terminal device.

For example, the width of the slit may range from 0.8 mm to 3 mm.

In one or more embodiments, the length of the conductive frame is between 15 mm and 25 mm.

It can be understood that the antenna according to the embodiments of the present disclosure occupies a small part of the frame of the housing to receive and transmit a wireless signal in the intermediate-frequency and high-frequency, and more space may be reserved for other devices in the terminal device. For instance, the remaining frame may supply power to other adjacent antennas, thereby improving the space utilization ratio of the terminal device.

The technical solutions provided by the embodiments of the present disclosure may have the following beneficial effects.

In the embodiments of the present disclosure, the first frame connecting point and the second frame connecting point are disposed on the conductive frame, and antennas for receiving and transmitting signals in different frequency bands may be formed based on the components such as a frame through the connection between the first frame connecting point as well as the second frame connecting point and the feeding point, which reduces the number of the components of the antenna, reduces the space occupied by the antennas in the terminal device, and improves a space utilization ratio of the terminal device, as compared with a condition that different antenna structures are required for radiating wireless signals in different frequency bands. Furthermore, in the embodiments of the present disclosure, the conductive frame in the housing forms the antenna, and no additional space is occupied in the terminal device, thereby further reducing the space occupied by the antenna in the terminal device, and improving the space utilization ratio of the terminal device.

It should be noted that the "first", "second", "third" and "fourth" in the embodiments of the present disclosure are merely convenient for expression and distinction, and have no other specific meanings.

Figure 10:
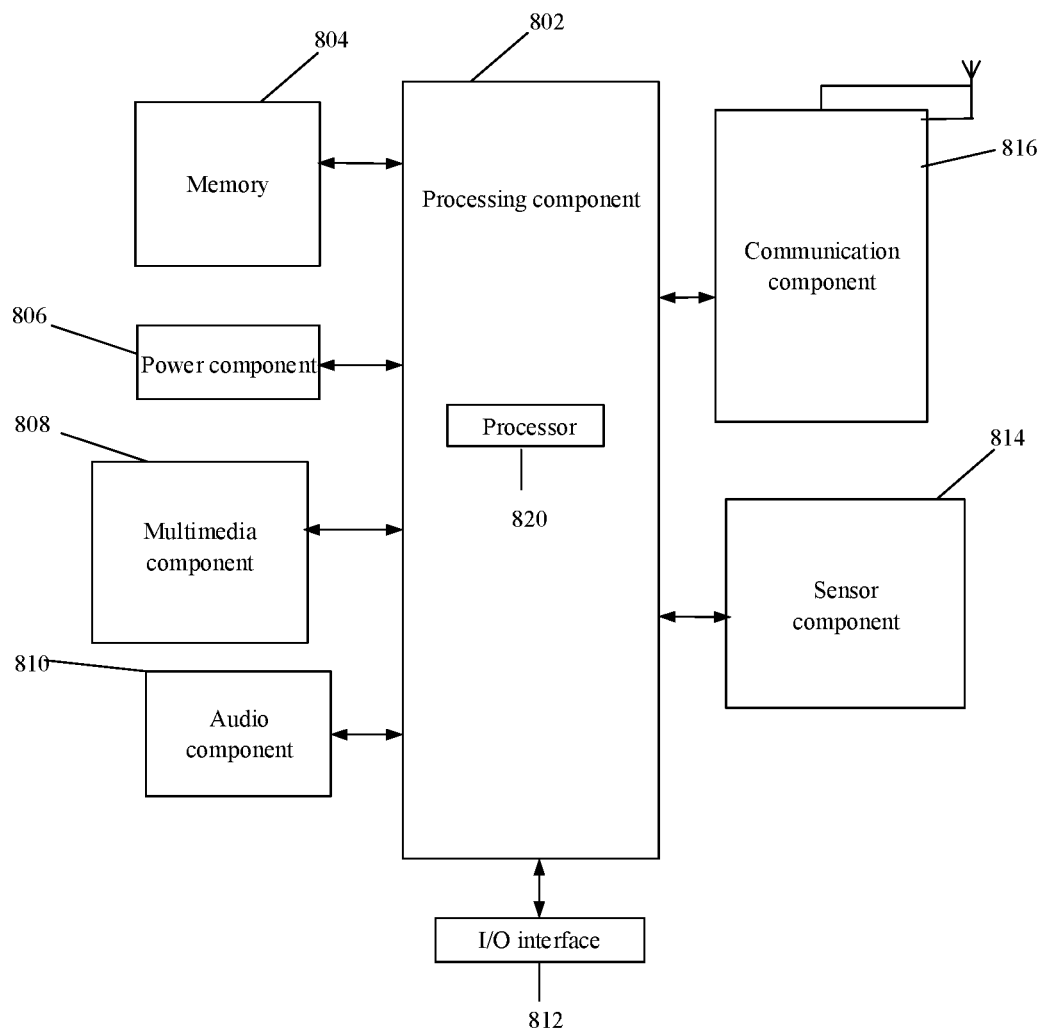
FIG. 10 is a block diagram of a terminal device according to an example.

FIG. 10 is a block diagram of a terminal device 800 according to an example. For example, the terminal device 800 may be a mobile phone, a computer, a digital broadcast terminal, a messaging device, a gaming console, a tablet, a medical device, exercise equipment, a personal digital assistant, and the like.

Referring to FIG. 10, the terminal device 800 may include one or more of the following components: a processing component 802, a memory 804, a power component 806, a multimedia component 808, an audio component 810, an input/output (I/O) interface 812, a sensor component 814, and a communication component 816.

The processing component 802 is typically configured to control overall operations of the device 800, such as the operations associated with display, telephone calls, data communications, camera operations, and recording operations. The processing component 802 may include one or more processors 820 to execute instructions to perform all or part of the operations in the abovementioned method. Moreover, the processing component 802 may include one or more portions which facilitate interaction between the processing component 802 and other components. For instance, the processing component 802 may include a multimedia portion to facilitate interaction between the multimedia component 808 and the processing component 802.

The memory 804 is configured to store various types of data to support the operation of the device 800. Examples of such data include instructions for any application programs or methods operated on the terminal 800, contact data, phonebook data, messages, pictures, video, etc. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 is configured to provide power for various components of the terminal 800. The power component 806 may include a power management system, one or more power supplies, and other components associated with generation, management and distribution of power for the terminal 800.

The multimedia component 808 may include a screen for providing an output interface between the terminal 800 and a user. In some examples, the screen may include a Liquid Crystal Display (LCD) and a Touch Panel (TP). If the screen includes the touch panel, the screen may be implemented as a touch screen to receive an input signal from the user. The touch panel includes one or more touch sensors to sense touches, swipes and gestures on the touch panel. The touch sensors may not only sense a boundary of a touch or swipe action but also detect a duration and pressure associated with the touch or swipe action. In some examples, the multimedia component 808 may include a front camera and/or a rear camera. The front camera and/or the rear camera may receive external multimedia data when the device 400 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the terminal 800 is in the operation mode, such as a call mode, a recording mode and a voice recognition mode. The received audio signal may further be stored in the memory 804 or transmitted through the communication component 816. In some examples, the audio component 810 may further include a speaker configured to output the audio signal.

The I/O interface 812 is configured to provide an interface between the processing component 802 and a peripheral interface portion, and the peripheral interface portion may be a keyboard, a click wheel, a button and the like. The button may include, but not limited to: a home button, a volume button, a starting button and a locking button.

The sensor component 814 may include one or more sensors configured to provide status assessment in various aspects for the device 800. For instance, the sensor component 814 may detect an on/off status of the device 800 and relative positioning of components, such as a display and small keyboard of the device 800, and the sensor component 814 may further detect a change in a position of the device 800 or a component of the terminal 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging APP. In some examples, the sensor component 814 may also include an acceleration sensor, a gyroscope sensor, a magnetic sensor, a pressure sensor or a temperature sensor.

The communication component 816 is configured to facilitate wired or wireless communication between the device 800 and other equipment. The device 800 may access a communication-standard-based wireless network, such as a Wireless Fidelity (WiFi) network, a 2nd-Generation (2G) or 3rd-Generation (3G) network or a combination thereof. In an example, the communication component 816 is configured to receive a broadcast signal or broadcast associated information from an external broadcast management system through a broadcast channel. In some embodiments of the present disclosure, the communication component 816 may further include a Near Field Communication (NFC) portion to facilitate short-range communication. For example, the NFC portion may be implemented based on a Radio Frequency Identification (RFID) technology, an Infrared Data Association (IrDA) technology, an Ultra-WideBand (UWB) technology, a Bluetooth (BT) technology and another technology.

In examples, the terminal device 800 may be implemented with one or more

Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components, for performing the above described methods.

Other implementation solutions of the present disclosure will be apparent to those skilled in the art from consideration of the specification and practice of the present disclosure. This disclosure is intended to cover any variations, uses, or adaptations of the present disclosure following the general principles thereof and including such departures from the present disclosure as come within known or customary practice in the art. It is intended that the specification and examples are considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only is limited by the appended claims.

The invention claimed is:

1. A terminal device, comprising:
a housing comprising a conductive frame, wherein a first frame connecting point, a second frame connecting point and a grounding point are disposed on the conductive frame, and the second frame connecting point is disposed between the first frame connecting point and the grounding point; and
a feeding point disposed on a circuit board and configured to input or output an electric signal, wherein the grounding point is connected with a first grounding end through a third signal wire, and the first grounding end is disposed on the circuit board;
a first antenna formed by the feeding point, a first signal wire, the first frame connecting point, the third signal wire, and the conductive frame when the first frame connecting point is connected with the feeding point through the first signal wire and the second frame connecting point is disconnected from the feeding point, wherein the first antenna is configured to receive and transmit a first wireless signal in a first frequency band; and
a second antenna formed by the feeding point, a second signal wire, the third signal wire, the second frame connecting point, and the conductive frame when the first frame connecting point is disconnected from the feeding point and the second frame connecting point is connected with the feeding point through the second signal wire, wherein the second antenna is configured to receive and transmit a second wireless signal in a second frequency band,
wherein a center frequency of the first frequency band is higher than a center frequency of the second frequency band.

2. The terminal device of claim 1, further comprising:
a third antenna is formed by the feeding point, the first signal wire, the second signal wire, the third signal wire, the first frame connecting point, the second frame connecting point and the conductive frame when the first frame connecting point is connected with the feeding point through the first signal wire and the second frame connecting point is connected with the feeding point through the second signal wire, and the third antenna is configured to enhance intensity a signal in a boundary frequency of the first frequency band.

3. The terminal device of claim 1, further comprising:
a fourth antenna configured to receive and transmit a third wireless signal, a center frequency of the third wireless signal is lower than the center frequency of the second frequency band, wherein when the fourth antenna receives and transmits the third wireless signal, the first frame connecting point is disconnected from the feeding point, and the second frame connecting point is disconnected from the feeding point.

4. The terminal device of claim 1, further comprising: at least one of following switches
a first switch disposed on the first signal wire, wherein the first frame connecting point is disconnected from the feeding point when the first switch is in a switched-off state, and the first frame connecting point is connected with the feeding point through the first signal wire when the first switch is in a switched-on state; or
a second switch disposed on the second signal wire, wherein the second frame connecting point is disconnected from the feeding point when the second switch is in a switched-off state, and the second frame connecting point is connected with the feeding point through the second signal wire when the second switch is in a switched-on state.

5. The terminal device of claim 2, further comprising: at least one of following switches
a first switch disposed on the first signal wire, wherein the first frame connecting point is disconnected from the feeding point when the first switch is in a switched-off state, and the first frame connecting point is connected with the feeding point through the first signal wire when the first switch is in a switched-on state; or
a second switch disposed on the second signal wire, wherein the second frame connecting point is disconnected from the feeding point when the second switch is in a switched-off state, and the second frame connecting point is connected with the feeding point through the second signal wire when the second switch is in a switched-on state.

6. The terminal device of claim 3, further comprising: at least one of following switches
a first switch disposed on the first signal wire, wherein the first frame connecting point is disconnected from the feeding point when the first switch is in a switched-off state, and the first frame connecting point is connected with the feeding point through the first signal wire when the first switch is in a switched-on state; or a second switch disposed on the second signal wire, wherein the second frame connecting point is disconnected from the feeding point when the second switch is in a switched-off state, and the second frame connecting point is connected with the feeding point through the second signal wire when the second switch is in a switched-on state.

7. The terminal device of claim 4, further comprising: a third switch,
wherein the third switch is connected between a second grounding end and the first signal wire, and is configured to disconnect the first signal wire from the second grounding end when the first antenna is formed, and connect the first signal wire with the second grounding end when the second antenna is formed.

8. The terminal device of claim 7, wherein when the first antenna is formed, the first switch is switched on, the second switch and the third switch are switched off, and when the second antenna is formed, the first switch, the second switch and the third switch are switched on.

9. The terminal device of claim 5, further comprising: a third switch,
wherein the third switch is connected between a second grounding end and the first signal wire, and is configured to disconnect the first signal wire from the second grounding end when the first antenna is formed, and connect the first signal wire with the second grounding end when the second antenna is formed.

10. The terminal device of claim 9, wherein when the third antenna is formed, the first switch and the second switch are switched on, and the third switch is switched off.

11. The terminal device of claim 6, further comprising: a third switch,
wherein the third switch is connected between a second grounding end and the first signal wire, and is configured to disconnect the first signal wire from the second grounding end when the first antenna is formed, and connect the first signal wire with the second grounding end when the second antenna is formed.

12. The terminal device of claim 4, further comprising: a fourth switch,
wherein the fourth switch is connected between a third grounding end and the second signal wire, and is configured to connect the second signal wire with the third grounding end when the first antenna is formed, and disconnect the second signal wire from the third grounding end when the second antenna is formed.

13. The terminal device of claim 12, wherein when the first antenna is formed, the first switch, the second switch and the fourth switch are switched on, and when the second antenna is formed, the first switch and the fourth switch are switched off, and the second switch is switched on.

14. The terminal device of claim 5, further comprising: a fourth switch,
wherein the fourth switch is connected between a third grounding end and the second signal wire, and is configured to connect the second signal wire with the third grounding end when the first antenna is formed, and disconnect the second signal wire from the third grounding end when the second antenna is formed.

15. The terminal device of claim 14, wherein when the third antenna is formed, the first switch and the second switch are switched on, and the fourth switch is switched off.

16. The terminal device of claim 6, further comprising: a fourth switch,
wherein the fourth switch is connected between a third grounding end and the second signal wire, and is configured to connect the second signal wire with the third grounding end when the first antenna is formed, and disconnect the second signal wire from the third grounding end when the second antenna is formed.

17. The terminal device of claim 3, wherein the first signal wire and the second signal wire comprise:
a fourth signal wire having a first connecting end and a second connecting end, wherein the first connecting end is connected with the feeding point;
a first sub-signal wire connected between the first frame connecting point and the second connecting end;
a second sub-signal wire connected between the second frame connecting point and the second connecting end; and
the terminal device further comprises:
a fifth switch disposed on the fourth signal wire, and configured to disconnect the second frame connecting point from the feeding point and disconnect the first frame connecting point from the feeding point when the fourth antenna receives and transmits a fourth wireless signal.

18. The terminal device of claim 1, wherein the housing is a rectangular housing, the housing comprises a first short frame, a second long frame and a third long frame, the first short frame is connected between the second long frame and the third long frame, and the second long frame and the third long frame are oppositely disposed; and
at least a portion of the first short frame is the conductive frame.

19. The terminal device of claim 18, wherein a slit is disposed on the first short frame; and
the conductive frame is disposed between the slit and the second long frame, or the conductive frame is disposed between the slit and the third long frame.

20. The terminal device of claim 1, wherein the length of the conductive frame ranges between 15 mm and 25 mm.

* * * * *